US010623108B2

(12) United States Patent
Streshinsky et al.

(10) Patent No.: US 10,623,108 B2
(45) Date of Patent: *Apr. 14, 2020

(54) OPTICAL DELAY LINES FOR ELECTRICAL SKEW COMPENSATION

(71) Applicant: Elenion Technologies, LLC, New York, NY (US)

(72) Inventors: Matthew Akio Streshinsky, New York, NY (US); Ran Ding, New York, NY (US); Yang Liu, Elmhurst, NY (US); Ari Novack, New York, NY (US); Michael Hochberg, New York, NY (US); Alex Rylyakov, Staten Island, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,950

(22) Filed: Sep. 19, 2018

(65) Prior Publication Data

US 2019/0089465 A1     Mar. 21, 2019

Related U.S. Application Data

(63) Continuation of application No. 14/931,796, filed on Nov. 3, 2015, now Pat. No. 10,110,318.

(Continued)

(51) Int. Cl.
*H04B 10/2507* (2013.01)
*H04B 10/61* (2013.01)

(Continued)

(52) U.S. Cl.
CPC ........ *H04B 10/616* (2013.01); *G02B 6/4213* (2013.01); *G02B 6/4266* (2013.01); *G02B 6/4284* (2013.01); *G02B 6/4292* (2013.01); *G02F 1/313* (2013.01); *H04B 10/2507* (2013.01); *H04B 10/40* (2013.01); *H04B 10/50* (2013.01); *H04B 10/614* (2013.01);

(Continued)

(58) Field of Classification Search
None
See application file for complete search history.

(56) References Cited

U.S. PATENT DOCUMENTS 5,367,586 A * 11/1994 Glance ............... G02B 6/12021
                                                    385/24
7,945,165 B2 * 5/2011 Bernasconi ............. H04J 14/02
                                                    398/102

(Continued)

*Primary Examiner* — Jai M Lee
(74) *Attorney, Agent, or Firm* — Stratford Managers Corporation

(57) ABSTRACT

A skew compensation apparatus and method. In an optical system that uses optical signals, skew may be generated as the optical signals are processed from an input optical signal to at least two electrical signals representative of the phase-differentiated optical signals. A compensation of the skew is provided by including an optical delay line in the path of the optical signal that does not suffer the skew (e.g., that serves as the time base for the skew measurement). The optical delay line introduces a delay $T_{skew}$ equal to the delay suffered by the optical signal that is not taken as the time base. The two signals are thereby corrected for skew.

18 Claims, 11 Drawing Sheets

Related U.S. Application Data

(60) Provisional application No. 62/118,420, filed on Feb. 19, 2015, provisional application No. 62/132,742, filed on Mar. 13, 2015.

(51) Int. Cl.
*G02B 6/42* (2006.01)
*H04B 10/50* (2013.01)
*G02F 1/313* (2006.01)
*H04B 10/40* (2013.01)
*G02B 6/28* (2006.01)

(52) U.S. Cl.
CPC ......... *H04B 10/615* (2013.01); *G02B 6/2861* (2013.01); *G02B 6/4274* (2013.01)

(56) References Cited

U.S. PATENT DOCUMENTS

| | | | | |
|---|---|---|---|---|
| 8,660,020 B2* | 2/2014 | Perkins | ............ | H04J 14/02 14/2 |
| 8,818,141 B1* | 8/2014 | Hochberg | ............ | H04B 10/505 385/2 |
| 8,909,066 B2* | 12/2014 | Yoshida | ............ | H04B 10/532 398/152 |
| 8,948,614 B1* | 2/2015 | Schmidt | ............ | H04B 10/616 398/208 |
| 9,106,343 B2* | 8/2015 | Chien | ............ | H04B 10/5051 |
| 9,559,782 B2* | 1/2017 | Koebele | ............ | H04B 10/2581 |
| 10,110,318 B2* | 10/2018 | Streshinsky | ......... | G02B 6/4266 |
| 2007/0286612 A1* | 12/2007 | Kuwata | ............ | H04B 10/6971 398/208 |
| 2008/0205889 A1* | 8/2008 | Aoki | ............ | H04Q 11/0005 398/51 |
| 2008/0297270 A1* | 12/2008 | Takahara | ............ | G02F 1/225 332/144 |
| 2009/0129780 A1* | 5/2009 | Bernasconi | ............ | H04J 14/02 14/2 |
| 2009/0148170 A1* | 6/2009 | Perkins | ............ | H04B 10/5053 398/152 |
| 2010/0119189 A1* | 5/2010 | Nasu | ............ | G02B 6/12007 385/1 |
| 2010/0178065 A1* | 7/2010 | Nishihara | ............ | H04B 10/61 398/202 |
| 2011/0229127 A1* | 9/2011 | Sakamoto | ............ | H04B 10/60 398/25 |
| 2012/0106984 A1* | 5/2012 | Jones | ............ | H04B 10/60 398/214 |
| 2012/0207474 A1* | 8/2012 | Inoue | ............ | H04B 10/60 398/65 |
| 2012/0237202 A1* | 9/2012 | Abe | ............ | H04B 10/616 398/16 |
| 2012/0250793 A1* | 10/2012 | Khatana | ............ | H04L 27/364 375/308 |
| 2012/0263456 A1* | 10/2012 | Tanaka | ............ | H04B 10/5055 398/25 |
| 2013/0251082 A1* | 9/2013 | Abe | ............ | H04L 1/0036 375/350 |
| 2013/0266308 A1* | 10/2013 | Fukuchi | ............ | H04B 10/616 398/16 |
| 2016/0261350 A1* | 9/2016 | Nakamura | ............ | H04B 10/572 |
| 2016/0261351 A1* | 9/2016 | Raybon | ............ | G02B 6/2861 |
| 2016/0285561 A1* | 9/2016 | Wu | ............ | G02B 6/305 |

\* cited by examiner

OPTICAL DELAY LINES FOR ELECTRICAL SKEW COMPENSATION

CROSS-REFERENCE TO RELATED APPLICATIONS

This application is a continuation of U.S. patent application Ser. No. 14/931,796, filed Nov. 3, 2015, now allowed, which claims priory to and the benefit of U.S. Provisional Application No. 62/118,420, filed Feb. 19, 2015, and U.S. Provisional Application No. 62/132,742, filed Mar. 13, 2015, each of which applications is incorporated herein by reference in its entirety.

FIELD OF THE INVENTION

The invention relates to systems and method for controlling signal propagation in dual-polarization coherent communication systems in general and particularly to skew compensation in such systems.

BACKGROUND OF THE INVENTION

FIG. 1 is a schematic block diagram 100 of the electrical and optical components of a prior art coherent optical transceiver. Skew can be introduced in the traces between elements as well as within each element. It would be advantageous for each element to compensate for skew.

In dual-polarization coherent communication, there are at least four signal paths from the digital signal processor (DSP) to the output optical signal. These are the in-phase and quadrature modulator inputs for X- and Y-input optical polarizations. X- and Y-polarizations are orthogonal polarizations in the input optical fiber. In such a scenario, it is important that the relative timing skew between each of these signal paths from the DSP to the output optical signal is kept as low as possible. There is skew between X- and Y-polarizations, as well as between the In-phase and Quadrature components of a signal within a certain polarization. These are called XY and IQ timing skews, respectively. Similarly, there are four such paths from the incoming optical signal to the DSP. There can be both XY and IQ timing skew in the transmitter and in the receiver.

There is a need for improved systems and methods for correcting skew.

SUMMARY OF THE INVENTION

According to one aspect, the invention features a skew compensation apparatus, comprising: a signal converter selected from the group of signal converters consisting of a signal converter that is configured to convert at least two optical signals into at least two electrical signals and a signal converter that is configured to convert at least two electrical signals into at least two optical signals; a first one of the at least two electrical signals subject to a delay of magnitude $T_{skew}$ relative to a second one of the at least two electrical signals; the signal converter having at least two optical ports and at least two electrical ports, the at least two optical ports selected from the group consisting of at least two input ports and at least two output ports, and the at least two electrical ports selected from the other type of port in the group consisting of at least two input ports and at least two output ports; and at least one optical delay line in optical communication with at least one of the at least two optical ports, the at least one optical delay line configured to apply a correction comprising a compensation delay to a selected one of the first one and the second one of the at least two electrical signals so that after the correction, the time delay between the first one and the second one of the at least two electrical signals is different from $T_{skew}$.

In one embodiment, the delay after correction is less than $T_{skew}$.

In another embodiment, the delay after correction is greater than $T_{skew}$.

In yet another embodiment, the at least two optical signals are phase differentiated and comprise an I component and a Q component.

In still another embodiment, the at least two optical signals are converted from orthogonal polarizations in an optical carrier.

In a further embodiment, the at least one optical delay line is a single mode waveguide.

In yet a further embodiment, the at least one optical delay line is a multi-mode waveguide.

In an additional embodiment, the at least one optical delay line has an adjustable optical path length.

In one more embodiment, the adjustable optical path length is configured to be thermally adjustable.

In still a further embodiment, the adjustable optical path length is configured to be adjustable by charge carrier concentration.

In another embodiment, the at least one optical delay line comprises silicon.

In yet another embodiment, the at least one optical delay line is a switched delay line.

In still another embodiment, the at least one optical delay line is a 1×N electro-optic switch combined with N waveguides having different lengths.

In a further embodiment, the skew compensation apparatus further comprises a thermal measurement device and a heater adjacent the optical delay line.

In yet a further embodiment, the skew compensation apparatus is configured to operate using an optical signal having a wavelength within the range of a selected one of an O-Band, an E-band, a C-band, an L-Band, an S-Band and a U-band.

According to another aspect, the invention relates to a method of compensating skew, comprising the steps of: providing an apparatus, comprising: a signal converter selected from the group of signal converters consisting of a signal converter configured to convert at least two optical signals into at least two electrical signals and a signal converter that configured to convert at least two electrical signals into at least two optical signals; a first one of the at least two electrical signals subject to a delay of magnitude $T_{skew}$ relative to a second one of the at least two electrical signals; the signal converter having at least two optical ports and at least two electrical ports, the at least two optical ports selected from the group consisting of at least two input ports and at least two output ports, and the at least two electrical ports selected from the other type of port in the group consisting of at least two input ports and at least two output ports; and at least one optical delay line in optical communication with at least one of the at least two optical port, the at least one optical delay line configured to apply a correction comprising a compensation delay to a selected one of the first one and the second one of the at least two electrical signals so that after the correction, the time delay between the first one and the second one of the at least two electrical signals is different from $T_{skew}$; and applying at least two input signals to the at least two input ports of the signal converter; and applying the compensation delay to a selected one of the first one and the second one of the at least two electrical signals so that the time delay between the first one and the second one of the at least two electrical signals is different from $T_{skew}$.

In one embodiment, the delay after correction is less than $T_{skew}$.

In another embodiment, the delay after correction is greater than $T_{skew}$.

In yet another embodiment, the method of compensating skew further comprises the step of determining the magnitude $T_{skew}$ of the delay.

In still another embodiment, the at least two optical signals are phase-differentiated and comprise an I component and a Q component.

In a further embodiment, the at least two optical signals are converted from orthogonal polarizations in the optical carrier.

In yet a further embodiment, the at least one optical delay line is a single mode waveguide.

In an additional embodiment, the at least one optical delay line is a multi-mode waveguide.

In one more embodiment, the at least one optical delay line has an adjustable optical path length.

In still a further embodiment, the adjustable optical path length is configured to be thermally adjustable.

In one embodiment, the adjustable optical path length is configured to be adjustable by charge carrier concentration.

In another embodiment, the at least one optical delay line comprises silicon.

In yet another embodiment, the at least one optical delay line is a switched delay line.

In still another embodiment, the at least one optical delay line is a 1×N electro-optic switch combined with N waveguides having different lengths.

In a further embodiment, the method of compensating skew in an optical system further comprises a thermal measurement device and a heater adjacent the optical delay line.

In yet a further embodiment, the input optical signal has a wavelength within the range of a selected one of an O-Band, an E-band, a C-band, an L-Band, an S-Band and a U-band.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 2A is a graph of XI and XQ signal waveforms versus time as initially provided with zero skew.

DETAILED DESCRIPTION

Acronyms

A list of acronyms and their usual meanings in the present document (unless otherwise explicitly stated to denote a different thing) are presented below.

AMR Adabatic Micro-Ring
APD Avalanche Photodetector
ARM Anti-Reflection Microstructure
ASE Amplified Spontaneous Emission
BER Bit Error Rate
BOX Buried Oxide
CMOS Complementary Metal-Oxide-Semiconductor
CMP Chemical-Mechanical Planarization
DBR Distributed Bragg Reflector
DC (optics) Directional Coupler
DC (electronics) Direct Current
DCA Digital Communication Analyzer
DRC Design Rule Checking
DUT Device Under Test
ECL External Cavity Laser
FDTD Finite Difference Time Domain
FOM Figure of Merit
FSR Free Spectral Range
FWHM Full Width at Half Maximum
GaAs Gallium Arsenide
InP Indium Phosphide
LiNO₃ Lithium Niobate
LIV Light intensity (L)-Current (I)-Voltage (V)
MFD Mode Field Diameter
MPW Multi Project Wafer
NRZ Non-Return to Zero
PIC Photonic Integrated Circuits
PRBS Pseudo Random Bit Sequence PDFA Praseodymium-Doped-Fiber-Amplifier
PSO Particle Swarm Optimization
Q Quality factor $$Q = 2\pi \times \frac{\text{Energy Stored}}{\text{Energy dissipated per cycle}} = 2\pi f_r \times \frac{\text{Energy Stored}}{\text{Power Loss}},$$

QD Quantum Dot
RSOA Reflective Semiconductor Optical Amplifier
SOI Silicon on Insulator
SEM Scanning Electron Microscope
SMSR Single-Mode Suppression Ratio
TEC Thermal Electric Cooler
WDM Wavelength Division Multiplexing FIG. 2A is a graph 200 of XI and XQ signal waveforms versus time as initially provided with zero skew. In FIG. 2A there are shown a waveform 202 which can be the XI component and a waveform 204 which can be the XQ component of a dual-polarization coherent communication system.

Figure 1:
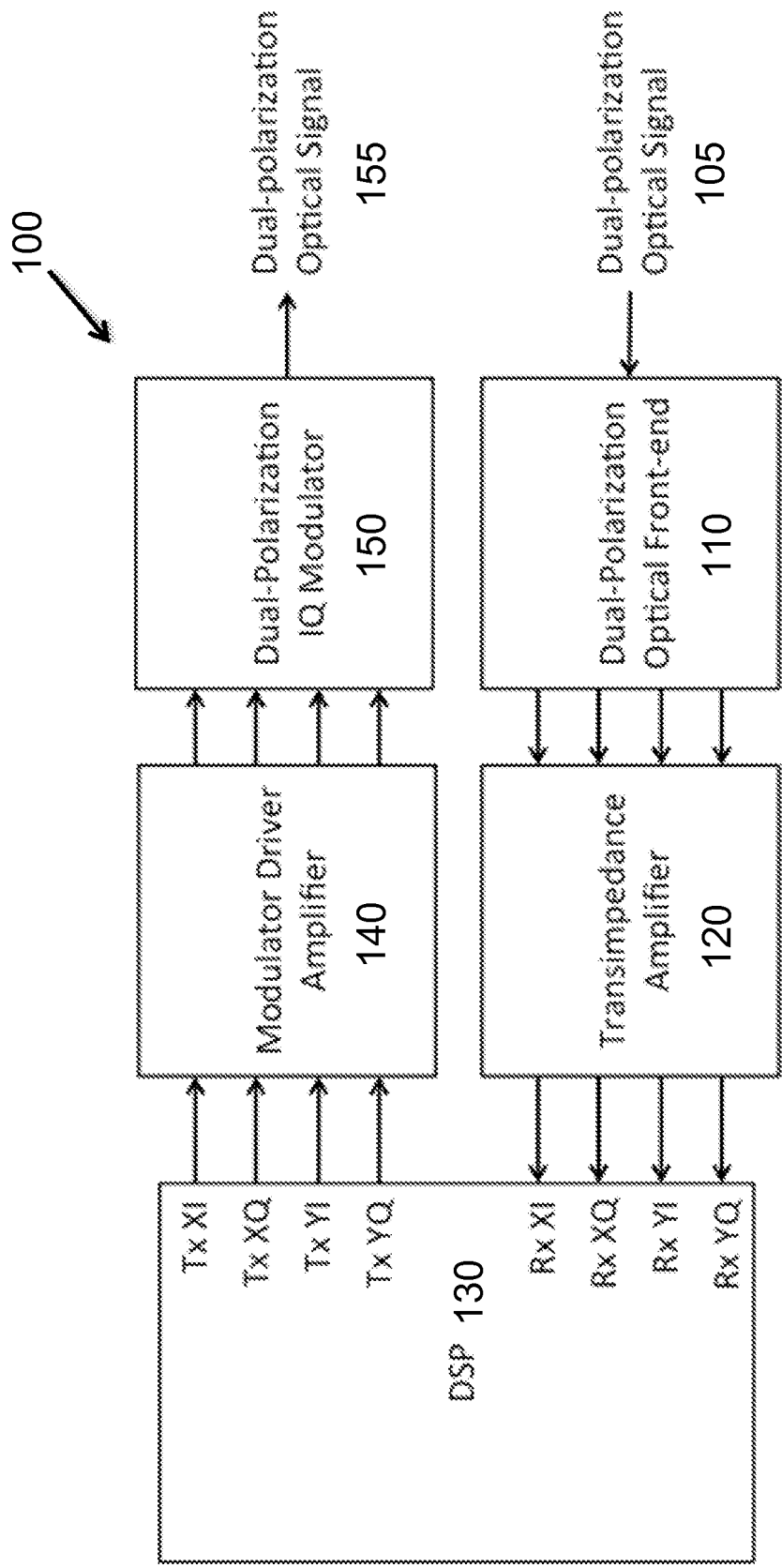
FIG. 1 is a schematic block diagram of the electrical and optical components of a prior art coherent optical transceiver.
Figure 2B:
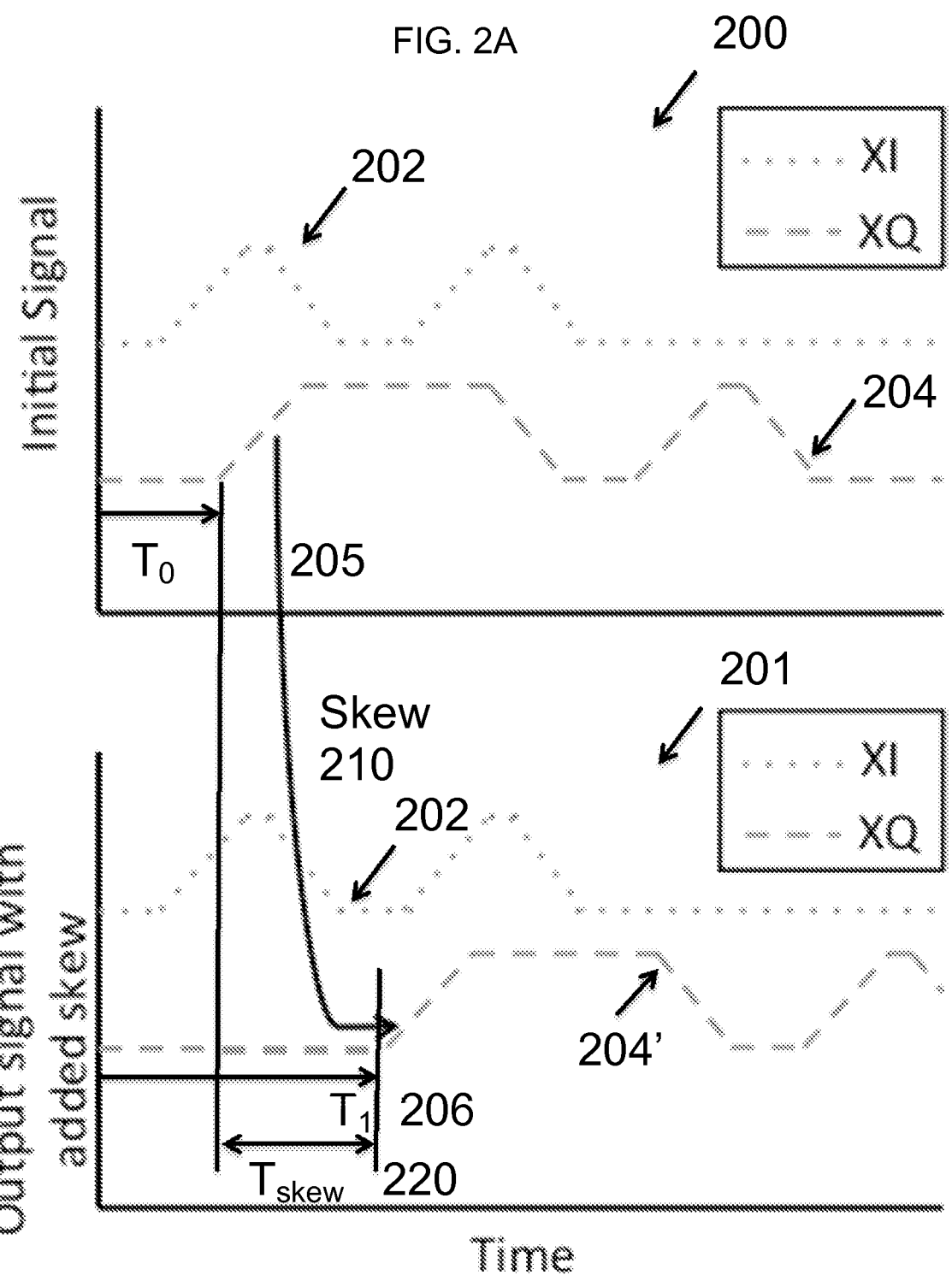
FIG. 2B is a graph of XI and XQ signal waveforms versus time with skew introduced, showing how one defines or measures $T_{skew}$.

FIG. 2B is a graph 201 of XI and XQ signal waveforms versus time with skew introduced, showing how one defines or measures $T_{skew}$. In FIG. 2B, the waveform 202 is illustrated as being in the same relative time relation that it had in FIG. 2A. One can understand this as using waveform 202 as a time baseline. However, waveform 204' is displaced in time relative to waveform 202, as indicated by the curved arrow 210, which displacement is called the skew. The time $T_{skew}$ 220 which is a measure of the amount of displacement is the difference between the relative time offset $T_0$ 205 in FIG. 2A and the relative time offset $T_1$ 206 in FIG. 2B. $T_{skew}$ 220 may be represented by the relation $T_{skew}$=Absolute value$(T_1-T_0)$.

The skew in FIG. 2A is illustrated for the XQ component relative to the XI component. However, in real systems it is possible to have skew defined as the offset of the XI component relative to the XQ component (e.g., the XQ component is used as the time base for measurement). In similar fashion, the YI and YQ components of the dual-polarization coherent communication system can also exhibit skew, using either the YI component or the YQ component as the time base for measurement.

The skew is compensated by applying a delay of magnitude $T_{skew}$ to the signal that is not skewed, so that both signal in a pair of signals XI. XQ and YI, YQ have equal delays, and are therefore in the original time relation that existed prior to the optical to electrical conversion. The compensation is applied in the optical domain as a compensation according to the principles of the invention, rather than in the electrical domain as a post-compensation relative to the optical to electrical conversion.

Figure 3A:
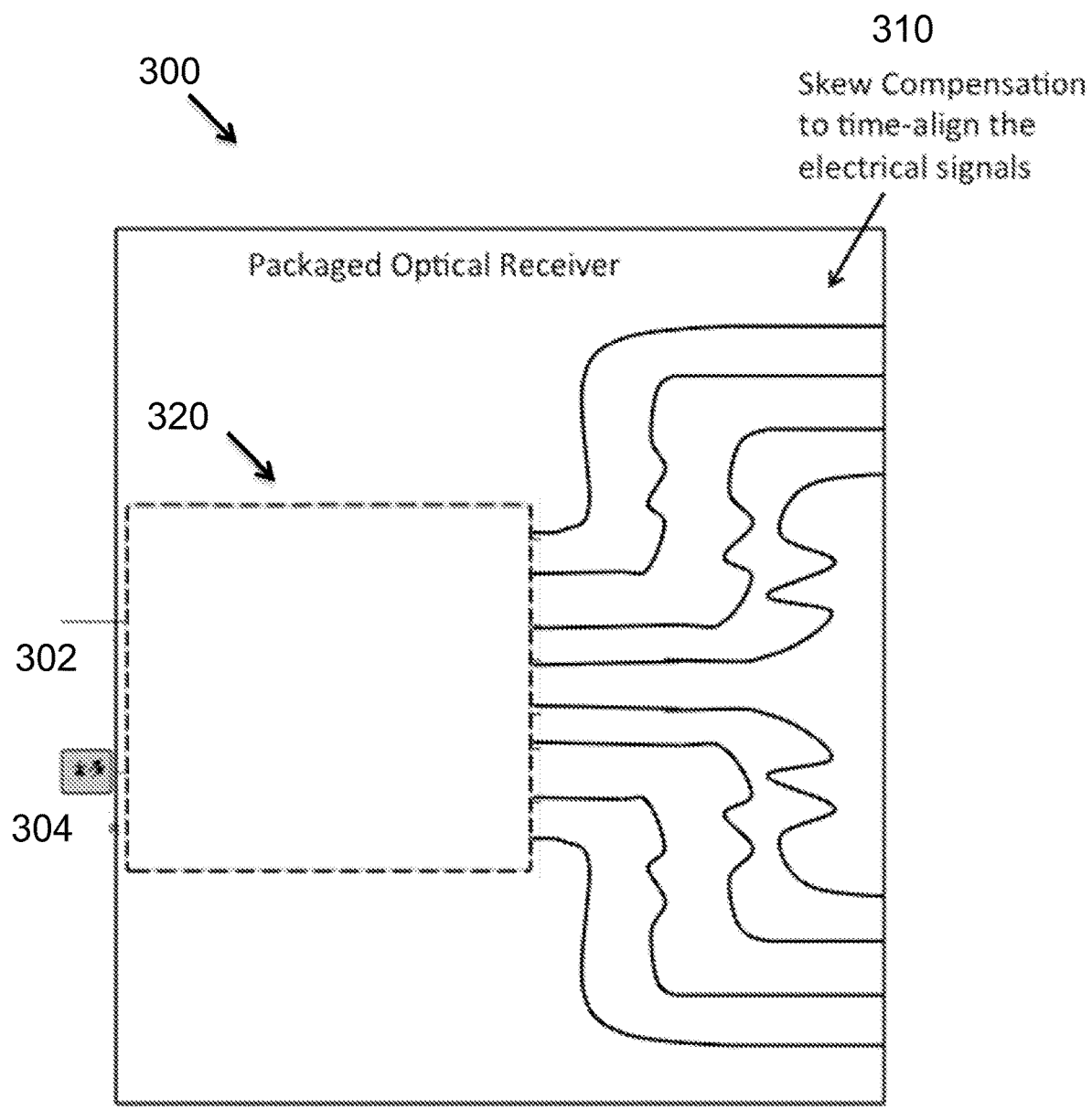
FIG. 3A is a diagram that illustrates skew compensation within a packaged optical receiver using electrical wiring traces that have different lengths.

FIG. 3A is a diagram 300 that illustrates skew compensation within a packaged optical receiver using electrical wiring traces 310 that have different lengths. In the embodiment illustrated, significant area is needed to time-align the signals from a set of transimpedance amplifiers (TIAs) to the electrical pins on the package. The optical receiver components are indicated by the block 320, which is shown in greater detail in FIG. 3B. The optical receiver has a signal input 302 that can receive an optical input signal. In some embodiments the optical input signal is part of a dual-polarization coherent communication system. The optical receiver has a local oscillator 304, for example a laser or a laser diode, which provides a frequency signal.

Each component in the signal paths adds some skew to the signal. This amount of skew should be minimized. The size of electro-optical modules implementing dual-polarization IQ modulators and receivers is affected by the amount of space needed to compensate for electrical skews. Electrical delays are needed in order to fan-out the electrical trace from some small component, such as an amplifier, to the pins on a package surrounding the device. As can be clearly seen, significant area is required for electrical skew compensation. It is well known that a foot (approximately 30 centimeters) of electrical wiring adds a delay of approximately one nanosecond to an electrical signal. Therefore, depending on the amount of skew (e.g., the value of $T_{skew}$) that has to be compensated by delaying the components that have not suffered skew, wiring of significant length may be required.

Figure 3B:
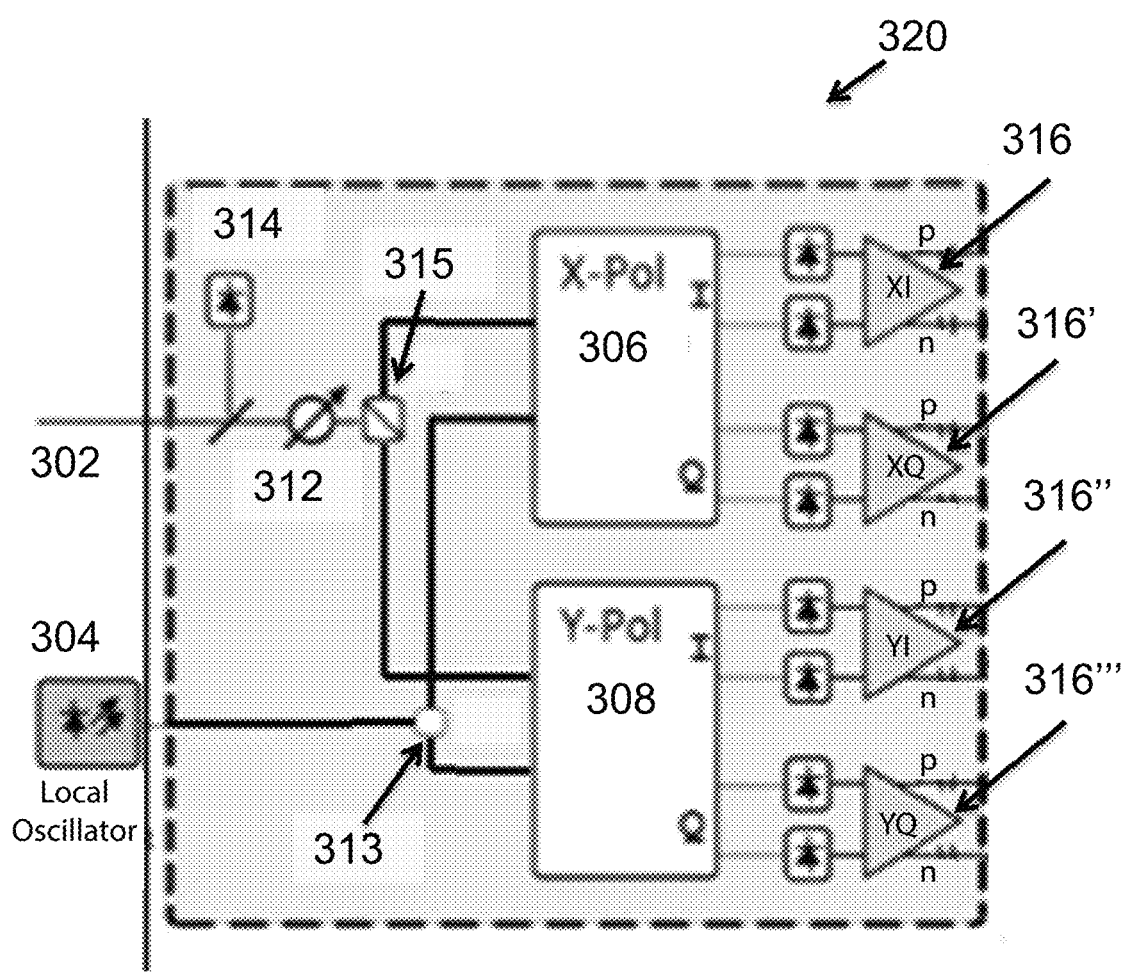
FIG. 3B is a diagram showing an embodiment of the electronic components in the packaged optical receiver of FIG. 3A.

FIG. 3B is a diagram showing an embodiment of the electronic components in the packaged optical receiver 320 of FIG. 3A. As shown in the embodiment of FIG. 3B, the input signal enters at port 302. A small portion of the input optical signal (typically less than 5%) is split off and sent to photodiode 314, which generates an electrical signal that can be used to monitor properties of the input optical signal, such as its power content. In other embodiments, the power can be monitored using different hardware. The remainder of the input optical signal is sent through a variable optical attenuator 312, which can adjust the signal intensity, and is split by a polarized beam splitter (PBS) 315 into x-polarized (X-Pol) and y-polarized (Y-Pol) components. The X-Pol component is sent to a 90 degree hybrid mixer 306, and the Y-Pol component is sent to a 90 degree hybrid mixer 308. The local oscillator 304 provides a signal that is split by beam splitter 313 and components of the local oscillator signal are sent to each of 90 degree hybrid mixers 306 and 308. The 90 degree hybrid mixers 306 and 308 are optical components that each generate two phase differentiated optical signals, the XI and XQ signals and the YI and YQ signals, respectively. Finally, each of the four phase differentiated signals are converted to electrical signals by respective photodiodes and electrical amplifiers (collectively indicated by the numerals 316, 316', 316" and 316'''). In some embodiments, the electrical amplifiers are transimpedance amplifiers, but in principle other kinds of amplifiers can also be used. The electrical signals are then provided at four respective output terminals (which may be single-sided signals referenced to a common ground or may be differential signals). Because skew is generated during the process of converting the input optical signal into the output electrical signals XI, XQ, YI and YQ; as well as in the length of electrical wiring due to the fan-out from the circuit to the package pins, post-compensation for the skew is then applied as shown in FIG. 3A. In principle, the systems and methods of the invention can also be applied to signals that are differentiated in amplitude or frequency.

In the systems and methods of the present invention, optical delay lines are used in order to pre-compensate for any electrical-domain skews in the optical signal paths. Optical delay lines can be integrated onto the same photonic integrated circuit that performs polarization splitting and the 90° mixing without enlarging the size of the chip. It is believed that an advantage of eliminating the need for electrical skew compensation is a reduction in the size of the larger package. In addition, optical compensation delay lines can be used to compensate for skews outside the package in any of the components and in wiring between a signal source or receiver, in either the transmit or receive path.

Figure 4:
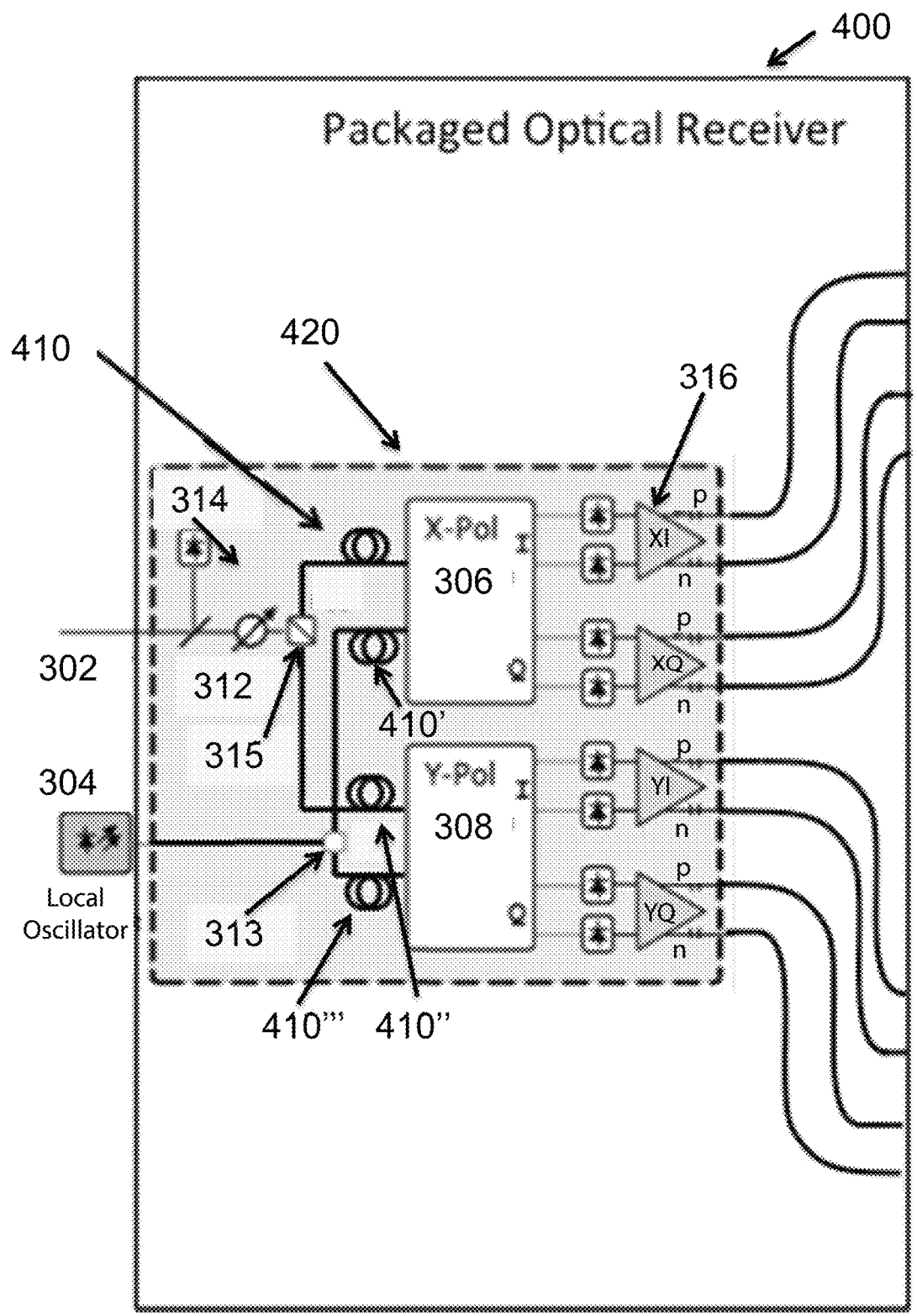
FIG. 4 is a diagram that shows an embodiment of the reduced package size enabled by moving skew compensation from the electrical domain to the optical domain, according to principles of the invention.

FIG. 4 is a diagram 400 that shows an embodiment of the reduced package size in a packaged optical receiver enabled by moving skew compensation from the electrical domain to the optical domain. The optical domain introduces timing skew that pre-corrects for the skew introduced later. The pre-correction is accomplished by applying a skew of the opposite sense to a signal that will suffer skew during the optical to electrical conversion process, so that the net skew for that signal is zero, or is as close to zero as is practical. As shown in FIG. 4, the packaged optical receiver 420 has all of the components present and described in in the packaged optical receiver 320 of FIG. 3B. In addition, the packaged optical receiver 420 has skew compensation elements 410, 410', 410" and 410'" (which can be optical delay lines) situated after the outputs of the X-Pol and Y-Pol 90 degree hybrid mixers 306 and 308.

In the systems and methods of the present invention, optical delay lines are used in order to pre-compensate for any electrical-domain skews in the optical signal paths. However, it may also be advantageous to increase the skew or reduce the skew to some other non-zero skew for the purposes of constructing a feed-forward, feed-backward, or equalizing filter.

It is believed that in various embodiments, the optical delay lines can be implemented using silicon optical waveguides on the same substrate as other optical and electro-optical components in the receiver path. Silicon waveguides can be very tightly confining, and delay lines up to many picoseconds can be accommodated without any impact on the total area requirement of the photonic integrated circuit.

While FIG. 4 shows an embodiment in which a skew compensation element is provided on each input of the 90 degree hybrid mixers 306 and 308, it should be understood that the skew compensation described herein can be implemented in a simpler, less capable system having only two electrical output components, by providing only one 90 degree hybrid mixer and only one skew compensation element in optical communication with one of the two optical inputs of the one 90 degree hybrid mixer. Such a system would not be effective in a full dual polarization coherent communication system in all instances, but it would be effective for a less capable coherent communication system having only two electrical output components.

While FIG. 4 shows an embodiment of a packaged optical receiver that comprises pre-skew compensation, it should be understood that one can equally provide the "mirror image" optical compensation for skew in a packaged optical transmitter. This may be readily envisioned by reversing the sense of the electrical signals to input signals in FIG. 4, reversing the sense of the electrical amplifiers 316, 316', 316" and 316'" by replacing them with optical modulators, replacing the 90 degree hybrid mixers with polarization rotators and splitters (PSRs) as described in U.S. provisional patent application No. 62/118,420 and in U.S. provisional patent application No. 62/132,742 (which polarization rotators and splitters are operated in the combining sense), and applying the skew correction described to the outputs of the PSRs before combining all the signals and providing them as output at an output port (e.g., the converse of the input port 302). Thereby providing an optical transmitter with optical skew compensation.

Figure 5:
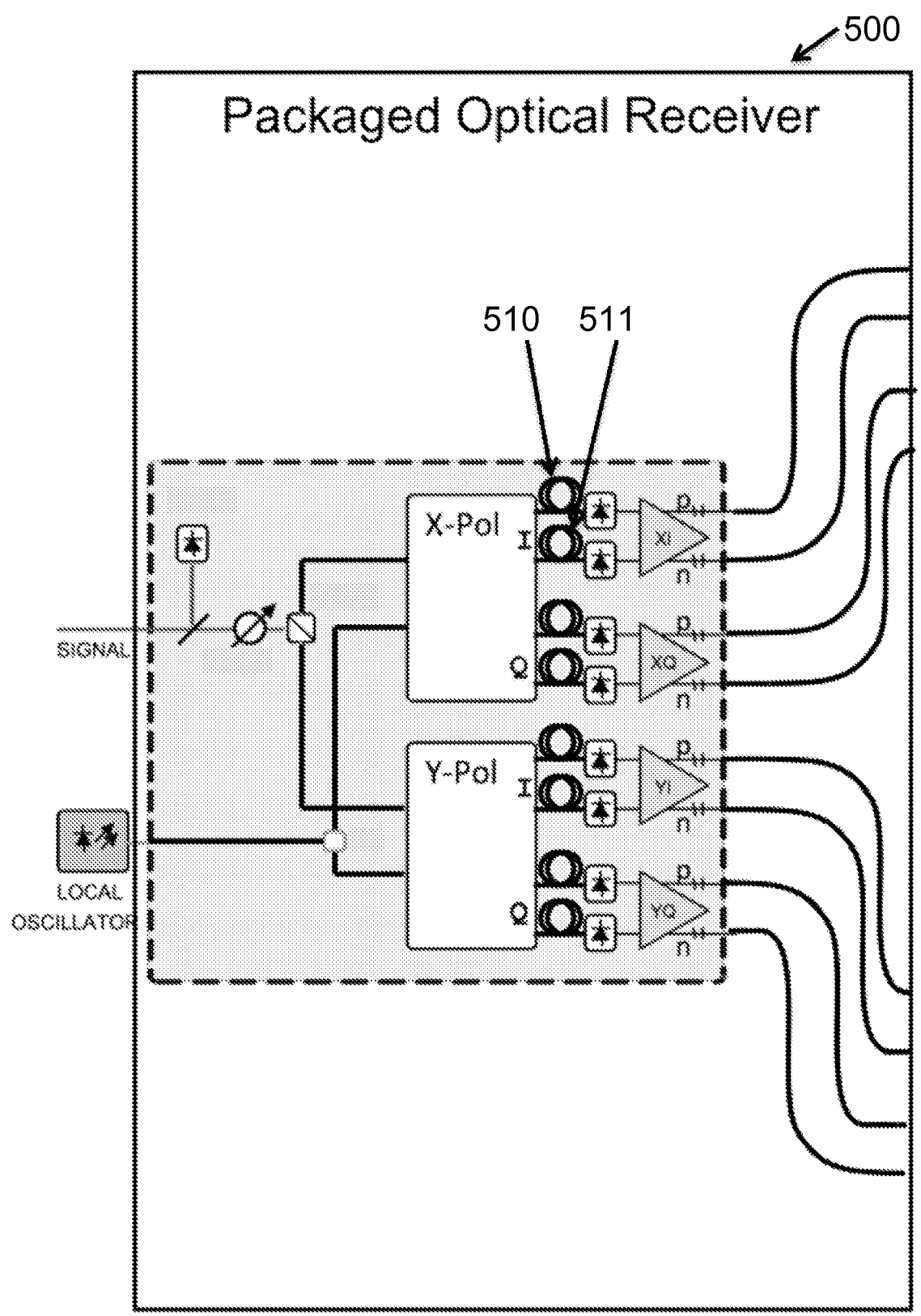
FIG. 5 is a diagram that shows an embodiment of the reduced package size enabled by moving skew compensation from the electrical domain to the optical domain. The optical domain introduces timing skew that pre-corrects for the skew introduced later.

FIG. 5 is a diagram that shows an embodiment of the reduced package size enabled by moving skew compensation from the electrical domain to the optical domain. In some embodiments, the optical domain introduces timing skew that pre-corrects for the skew introduced later. In FIG. 5, in the XI portion of the receiver, a skew compensation element (510, 511) is provided between the 90 degree hybrid mixer 306 and the electrical amplifier 316. Similar skew compensation elements are also shown in each of the other XQ, YI and YQ portions of the receiver. The components of the embodiment of FIG. 5 that are not explicitly identified with numerals are the equivalents of the corresponding components shown in FIG. 3 and FIG. 4.

Figure 6:
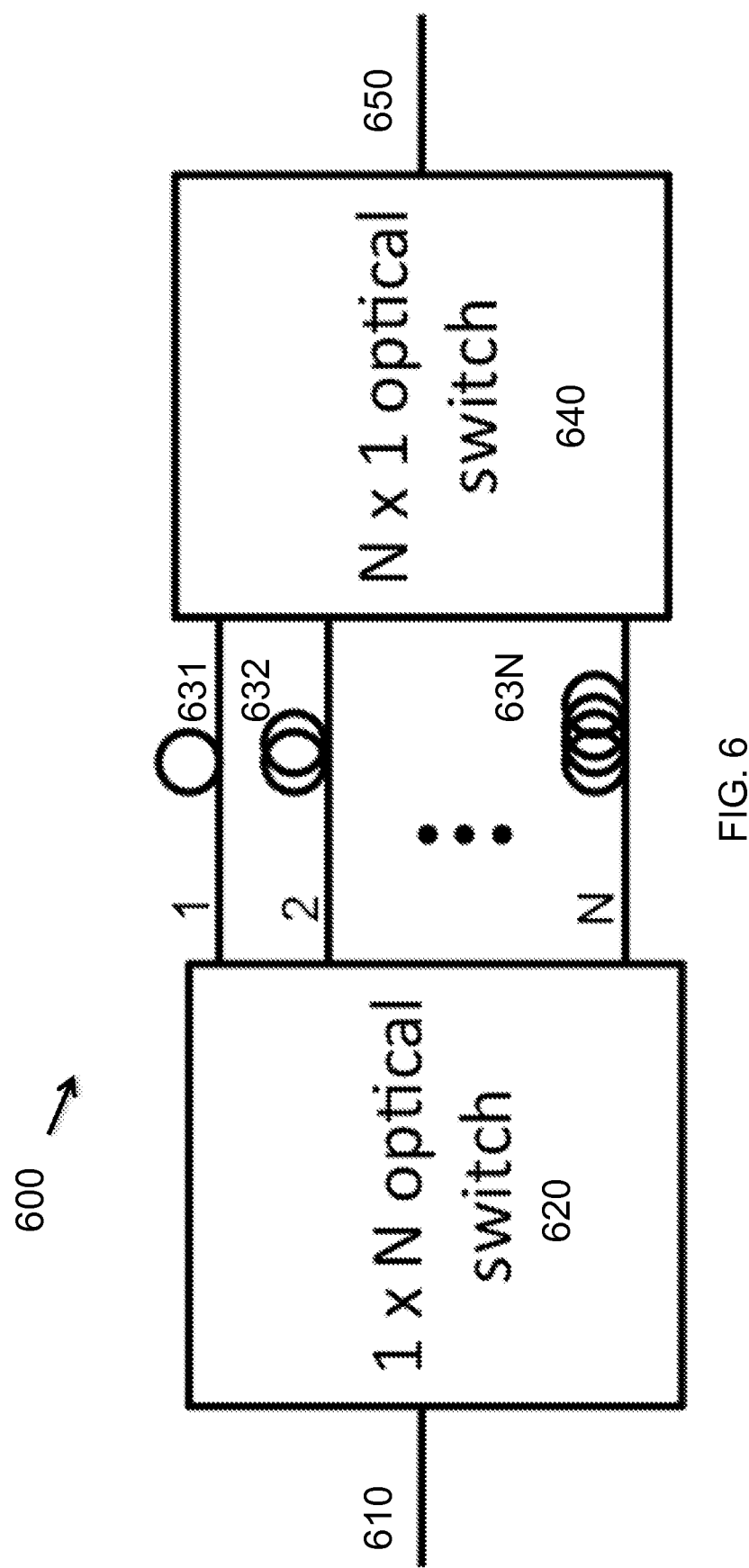
FIG. 6 is a schematic diagram of an embodiment in which a signal that requires a skew compensation which may vary with time or with frequency can be skew pre-compensated using one of N different skew compensation elements.

FIG. 6 is a schematic diagram 600 of an embodiment in which a signal that requires a skew compensation which may vary with time or with frequency can be skew pre-compensated using one of N different skew compensation elements. In FIG. 6, the optical signal enters on input port 610 and is switched by 1×N optical switch 620 to a respective one of N different skew compensation elements (631, 632, . . . , 63N) and then is switched by N×1 optical switch 640 to an output port 650. As long as 1×N optical switch 620 and N×1 optical switch 640 are operated to connect the same skew compensation element between the input port 610 and the output port 650 at any given time, the embodiment of FIG. 6 can be used to provide a selected one of N different skew compensation values to an optical signal.

Figure 7:
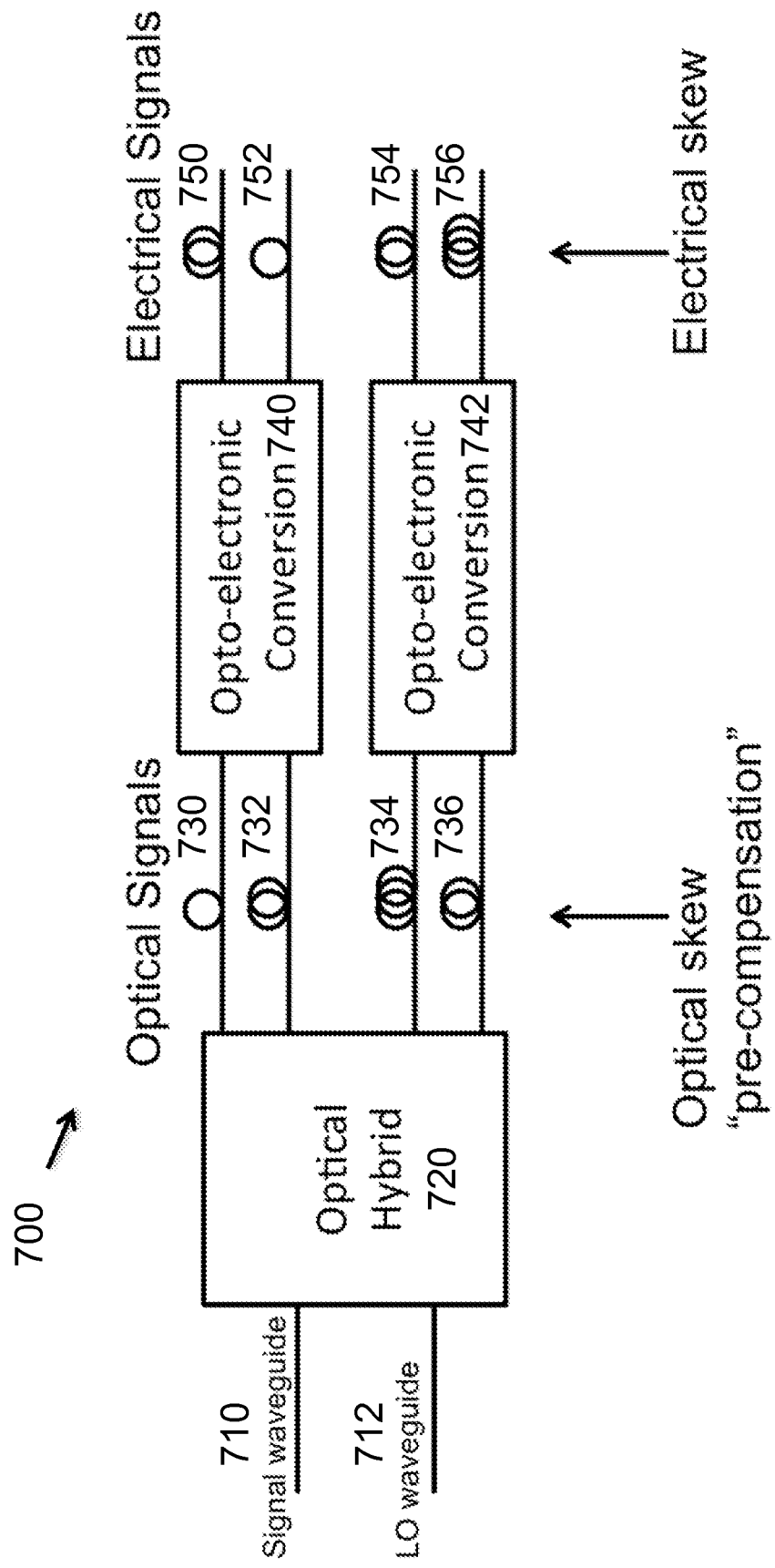
FIG. 7 is a schematic diagram that illustrates the general principles of the invention.

FIG. 7 is a schematic diagram 700 that illustrates the general principles of the invention. In the generic embodiment illustrated in FIG. 7, a signal input port (input signal waveguide) 710 and a reference signal input port 712 (LO or local oscillator waveguide) are provided. The two signals are processed in an optical hybrid element 720 to generate optical signals having different components. Optical skew compensation elements 730, 732, 734, 736 are provided to apply a pre-skew to each optical component. Opto-electronic conversion elements 740, 742 convert the optical signals into electrical signals that are transmitted and that will experience skews 750, 752, 754 and 756 during the electrical transmission. In FIG. 7, the electrical skews 750 and 752 are shown using the same schematic elements as pre-skews 732 and 730, respectively, which is intended to indicate that the pre-skew 730 when added to the skew 750 is the same total skew as the sum of pre-skew 732 and skew 752. Similarly, FIG. 7 is intended to indicate that the sum of pre-skew 734 and skew 754 equals the sum of pre-skew 736 and skew 756. By such skew compensation, the signals on the respective pairs of transmission lines arrive at their destination with zero relative skew to each other.

Figure 8:
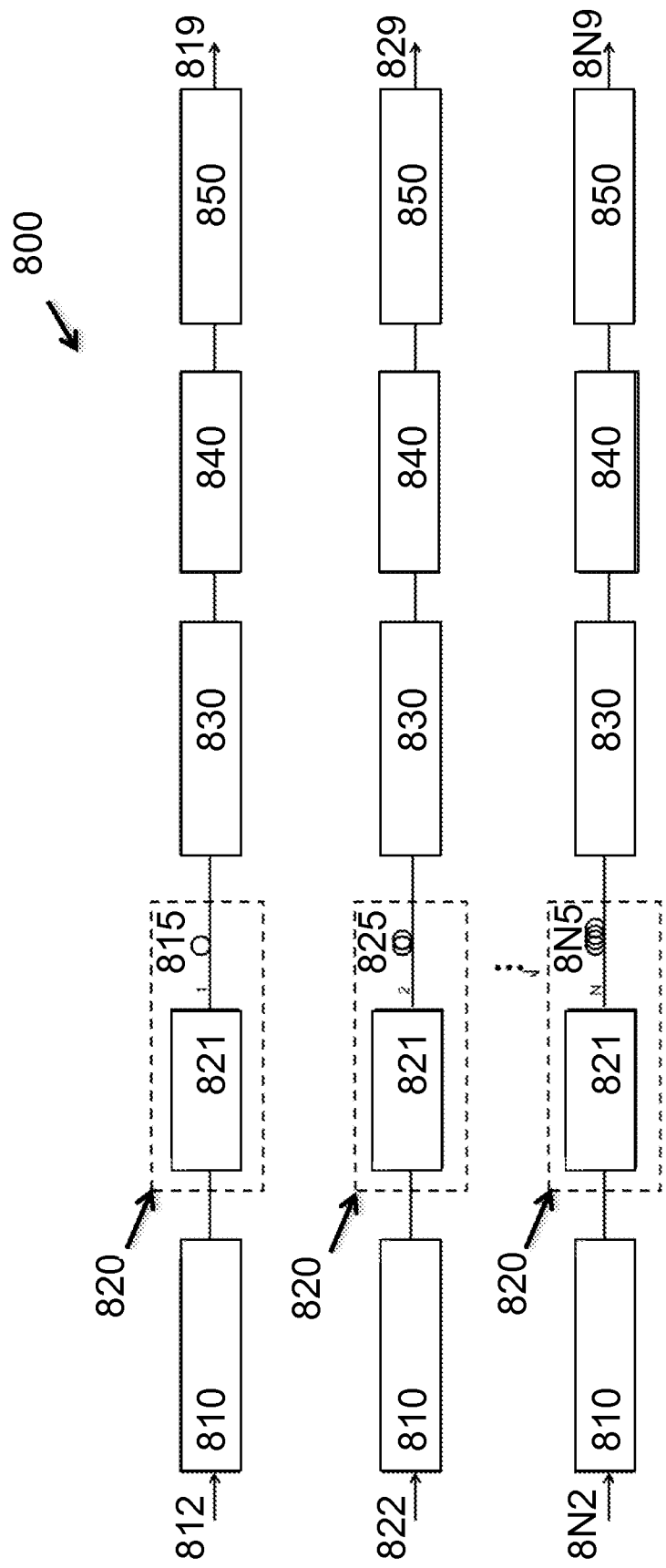
FIG. 8 is a schematic diagram of an embodiment of a system having N channels in parallel in which skew compensation in provided in a transmitter.

FIG. 8 is a schematic diagram 800 of an embodiment of a system having N channels in parallel in which skew compensation in provided in a transmitter.

In FIG. 8, the first channel has an electrical input 812, an electrical transmission medium 810, an optical transmitter 820 comprising an electro-optic converter 821 and a skew compensation element 815, an optical transmission medium 830, an optical receiver 840 and an electrical transmission medium 850 that provides an electrical signal at an electrical output port 819.

Channels 2, . . . , N have substantially identical elements 810, 820, 830, 840 and 850 as are present in Channel 1. However, each respective channel 2, . . . , N has a respective electrical input 822, . . . , 8N2, a respective skew compensation element 825, . . . , 8N5, and a respective electrical output port 829, . . . , 8N9.

Skew between channels 1, 2, . . . , N may be introduced in propagation through the transmission medium, the optical receiver, and the electrical transmission medium. The skew may be pre-compensated in the optical transmitter for the skews introduced in the aforementioned sources. The skews introduced may be a function of frequency. In some embodiments, the net skew introduced by the aforementioned sources is pre-compensated in the optical transmitter.

Figure 9:
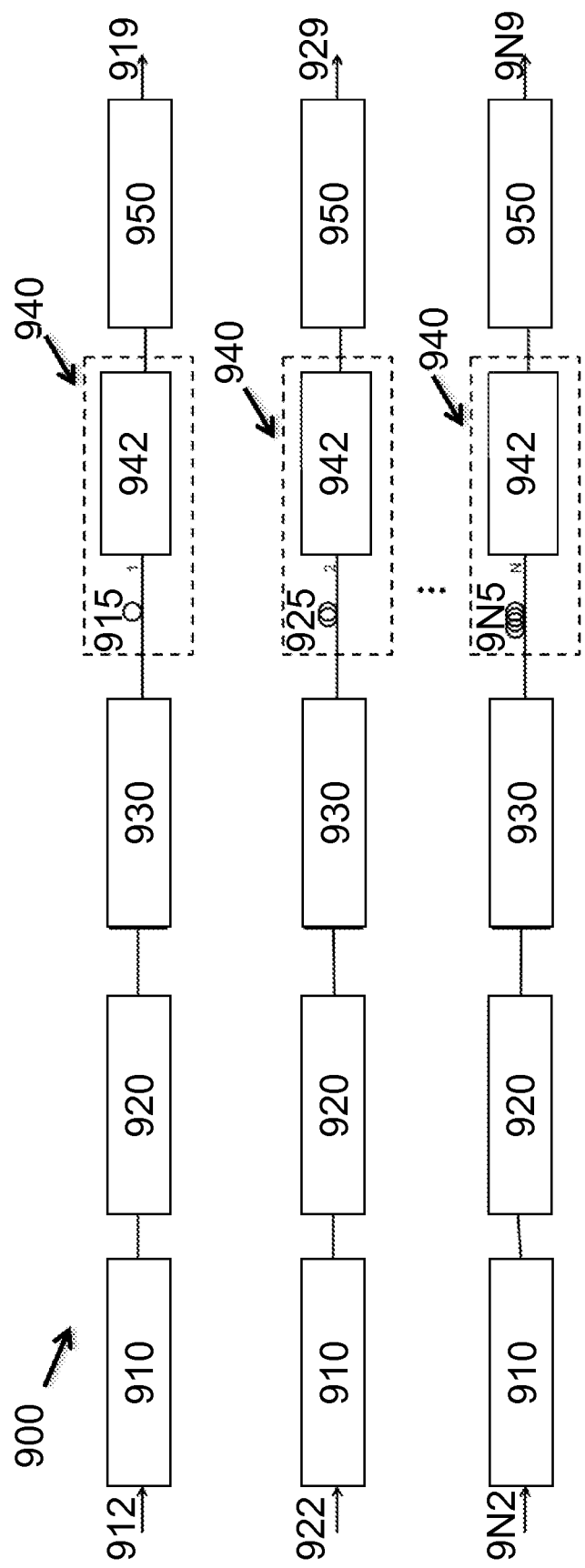
FIG. 9 is a schematic diagram of an embodiment having N channels in parallel in which skew compensation in provided in a receiver.

FIG. 9 a schematic diagram 900 of an embodiment having N channels in parallel in which skew compensation in provided in a receiver.

In FIG. 9, the first channel has an electrical input 912, an electrical transmission medium 910, an optical transmitter 920, an optical transmission medium 930, an optical receiver 940 comprising a skew compensation element 915 and an electro-optic converter 942 and an electrical transmission medium 950 that provides an electrical signal at an electrical output port 919.

Channels 2, . . . , N have substantially identical elements 910, 920, 930, 940 and 950 as are present in Channel 1. However, each respective channel 2, . . . , N has a respective electrical input 922, . . . , 9N2, a respective skew compensation element 925, . . . , 9N5, and a respective electrical output port 929, . . . , 9N9.

Skew between channels 1, 2, . . . , N may be introduced in propagation through the transmission medium, the optical transmitter, and the electrical transmission medium. The skew may be pre-compensated in the optical receiver for the skews introduced in the aforementioned sources. The skews introduced may be a function of frequency. In some embodiments, the net skew introduced by the aforementioned sources is pre-compensated in the optical receiver.

Figure 10:
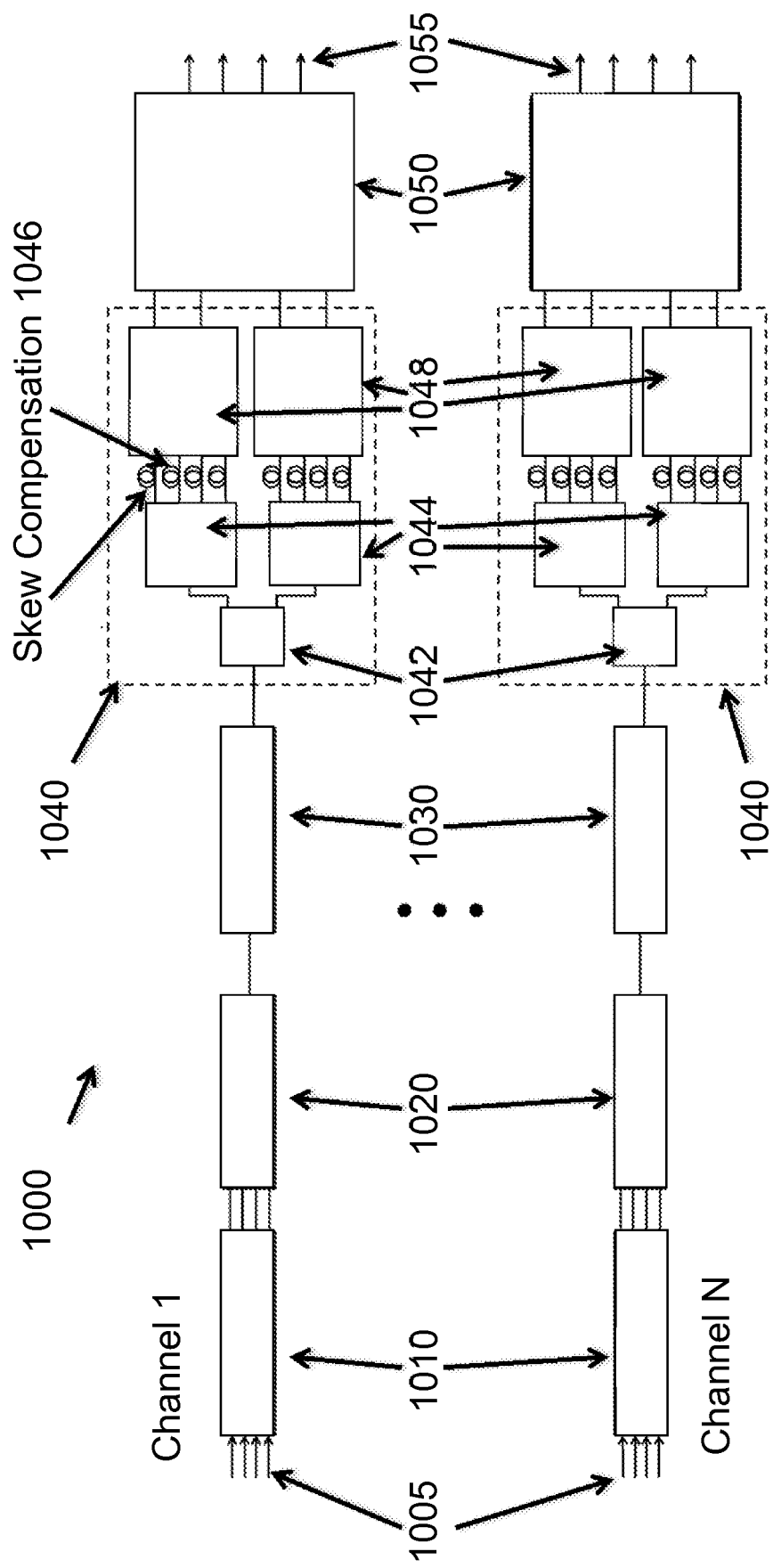
FIG. 10 is a schematic diagram of an embodiment in which N channels each having 4 electrical inputs and 4 electrical outputs are corrected for skew in a skew compensating module comprising a polarizing beamsplitter, one or more hybrid mixers, the skew compensation elements and one or more optoelectronic converters.

FIG. 10 is a schematic diagram 1000 of an embodiment in which N channels each having 4 electrical inputs and 4 electrical outputs are corrected for skew in a skew compensating module comprising a polarizing beamsplitter, one or more hybrid mixers, the skew compensation elements and one or more optoelectronic converters.

In the embodiment of FIG. 10, each of N channels includes a 4×N electrical input 1005, a first electrical transmission medium 1010, an optical transmitter 1020, an optical transmission medium 1030, a skew compensating module 1040 comprising a polarizing beamsplitter (PBS) 1042, one or more hybrid mixers 1044, the skew compensation elements 1046 and one or more optoelectronic converters 1048, and a first electrical transmission medium 1050 that sends signals out through a 4×N electrical output 1055.

Skew between channels 1, 2, . . . , N may be introduced in propagation through the first electrical transmission medium 1010, the optical transmitter 1020, and the optical transmission medium 1030. The skew may be pre-compensated in the skew compensating module 1040 for the skews introduced in the aforementioned sources. The skews introduced may be a function of frequency. In some embodiments, the net skew introduced by the aforementioned sources is pre-compensated in the skew compensating module 1040. For phase-differentiated signals, the skews need to be compensated after the hybrid mixer 1044.

Skew Compensation Embodiments
Silicon Single-Mode Waveguides for Short Skew Compensation In one embodiment, a 500 nm width and 220 nm height silicon waveguide clad in oxide approximately 75 μm of length corresponds to 1 picosecond of delay in the optical signal passing through the waveguide. This type of waveguide has on the order of 1 to 2 dB of optical loss per centimeter. Thus, relatively short skews of a few picoseconds can be compensated with a single-mode waveguide without significant excess loss.

Wide Multi-Mode Waveguides for Large Skew Compensation

In other embodiments, 1.2 μm width by 220 nm height silicon waveguides clad in oxide are multi-modal for illumination at 1550 nm wavelength, but can be adiabatically coupled into from single mode waveguides. The lowest propagation mode of wide waveguides typically has a very low insertion loss, typically on the order of 0.1 to 0.5 dB per centimeter. Thus, these types of waveguides are ideal for compensating large amounts of skew.

Periodic Mode Throttlers for Spectral Smoothness

A common problem in long waveguides is ripples that appear in the transmission spectrum. These ripples are caused in part by back-reflected light in higher order modes. A mode throttle is a waveguide-integrated device that passes the lowest order mode and attenuates higher order modes. If a long waveguide section has periodic mode throttlers integrated therein, the transmission spectrum may be smoothed. Thus, in some embodiments, the need for skew compensation is alleviated with the use of periodic mode throttlers in applications or systems that use both single- and multi-mode waveguides. The design and implementation of mode throttlers is described in greater detail in co-pending U.S., patent application Ser. No. 14/788,608, now U.S. Pat. No. 9,470,844.

Silicon Nitride Waveguides in the Front-End and Back-End Stack

Silicon nitride is another material that can be integrated on a SOI platform. Single-mode waveguides can be built in SiN and coupled to and from single-mode waveguides in silicon. It is believed that in various embodiments, these waveguides can also be used for skew compensation.

Additionally, it is possible to use the silicon nitride layers higher in the metal stack for optical routing. This is described in greater detail in co-pending U.S. patent application Ser. No. 14/798,780, now U.S. Pat. No. 9,588,298. Similarly, it is believed that these waveguides may be used for skew compensation in various embodiments.

Tunable Skew Compensation

It is often desirable to have variable skew compensation. The optical path length of a silicon waveguide can be adjusted by integrating heating resistors next to or in the waveguide. It is believed that long runouts of multi-mode waveguides with heaters can be used to create a very large tuning range. In some embodiments, a thermal measurement device is provided, whether a pn junction, a photodetector, an electro-absorption modulator, or some other electro-optical device. The thermal measurement device may be any convenient device. In some embodiments the thermal measurement device is a Proportional to Absolute Temperature (PTAT) device. Examples of prior art heaters and PTAT circuits are described in co-pending U.S. patent application Ser. No. 14/864,760, now U.S. Pat. No. 9,871,153, and in U.S. Pat. No. 8,274,021, and are believed to be suitable for use in the present invention.

In some embodiments, it is believed that it is possible to use the systems and methods described herein to increase the skew between two signals, for example for purposes of signal processing.

Feedforward and Feedback Control

In some embodiments, a feedback loop and/or a feed forward loop is provided to control skew observed between two signals. For example in a feedback control system, one can measure the net skew and control the corrective delay to achieve a desired amount of skew. In a feedforward system, if one has experience with specific circuits or devices and has a reasonable expectation of the uncorrected skew that may be expected, one can apply a compensation by way of a corrective delay to achieve an expected net skew, in the absence of making a measurement of the skew, either before or after the corrective delay is applied. Both feedback and feed-forward loops used to control or regulate signals are well known in the art.

Switched Delay Lines

An even larger distribution of skews can be accommodated through the use of switched delay lines. A 1×N electro-optic switch can be used to switch between N different sets of waveguide lengths. Furthermore, each individual waveguide runout within the switch may have a tunable length as described hereinabove to provide a continuously tunable large delay adjustment.

Operating Ranges

It is believed that apparatus constructed using principles of the invention and methods that operate according to principles of the invention can be used in the wavelength ranges described in Table I.

TABLE I

| Band | Description | Wavelength Range |
|---|---|---|
| O band | original | 1260 to 1360 nm |
| E band | extended | 1360 to 1460 nm |
| S band | short wavelengths | 1460 to 1530 nm |
| C band | conventional ("erbium window") | 1530 to 1565 nm |
| L band | long wavelengths | 1565 to 1625 nm |
| U band | ultralong wavelengths | 1625 to 1675 nm |

It is believed that in various embodiments, apparatus as previously described herein can be fabricated that are able to operate at a wavelength within the range of a selected one of an O-Band, an E-band, a C-band, an L-Band, an S-Band and a U-band.

It is believed that apparatus constructed using principles of the invention and methods that operate according to principles of the invention can be fabricated using materials systems other than silicon or silicon on insulator. Examples of materials systems that can be used include materials such as compound semiconductors fabricated from elements in Groups III and V of the Periodic Table (e.g., compound semiconductors such as GaAs, AlAs, GaN, GaP, InP, and alloys and doped compositions thereof).

Design and Fabrication

Methods of designing and fabricating devices having elements similar to those described herein, including high index contrast silicon waveguides, are described in one or more of U.S. Pat. Nos. 7,200,308, 7,339,724, 7,424,192, 7,480,434, 7,643,714, 7,760,970, 7,894,696, 8,031,985, 8,067,724, 8,098,965, 8,203,115, 8,237,102, 8,258,476, 8,270,778, 8,280,211, 8,311,374, 8,340,486, 8,380,016, 8,390,922, 8,798,406, and 8,818,141.

Definitions

As used herein, the term "optical communication channel" is intended to denote a single optical channel, such as light that can carry information using a specific carrier wavelength in a wavelength division multiplexed (WDM) system.

As used herein, the term "optical carrier" is intended to denote a medium or a structure through which any number of optical signals including WDM signals can propagate, which by way of example can include gases such as air, a void such as a vacuum or extraterrestrial space, and structures such as optical fibers and optical waveguides.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Incorporation by Reference

Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A communication system, comprising:
a transmitter capable of generating an input optical signal comprising first, second, third and fourth optical component signals;
a receiver configured to receive the first, second, third and fourth optical component signals from the transmitter via an optical medium, and to convert the first, second, third and fourth optical component signals into first, second, third and fourth electrical component signals, respectively; the second, third and fourth electrical component signal subject to timing delays relative to the first electrical component signal caused by the transmitter, the optical medium and the receiver;
a first skew compensation element consisting of a first waveguide optical delay line, consisting of a first single fixed length of waveguide configured to apply a first single fixed predetermined compensation timing delay to the second optical component signal, to at least partially compensate for at least one of the timing delays in the second electrical component signal;
a second skew compensation element consisting of a second waveguide optical delay line, consisting of a second single fixed length of waveguide configured to apply a second single fixed predetermined compensation timing delay to the third optical component signal, to at least partially compensate for the timing delay in the third electrical component signal; and
a third skew compensation element consisting of a third waveguide optical delay line, consisting of a third single fixed length of waveguide configured to apply a third single fixed predetermined compensation timing delay to the fourth optical component signal, to at least partially compensate for the timing delay in the fourth electrical component signal.

2. The system according to claim 1, wherein the receiver comprises:
an input port for inputting the input optical signal;
a polarization beam splitter for splitting the input optical signal into first and second polarized components;
a local oscillator for generating first and second oscillator components;
a first hybrid mixer for generating the first and second optical component signals, which are phase differentiated, from the first polarized component and the first oscillator component; and
a second hybrid mixer for generating the third and fourth optical component signals, which are phase differentiated, from the second polarized component and the second oscillator component.

3. The system according to claim 2, wherein the first, second and third waveguide optical delay lines are disposed between the polarization beam splitter and at least one of the first and second hybrid mixer, and between the local oscillator and at least one of the first and second hybrid mixer.

4. The system according to claim 2, wherein the receiver further comprises respective photodiodes and electrical amplifiers for converting each of said first, second, third and fourth optical component signals into the first, a second, a third and a fourth electrical component signals, and thereby contributing to the generation of the timing delays in the second, third and fourth electrical component signals.

5. The system according to claim 4, wherein the waveguide optical delay lines are disposed between the first and second hybrid mixers and the respective photodiodes.

6. The system according to claim 1, wherein the first skew compensation element is disposed in the transmitter.

7. The system according to claim 1, wherein each of the first, second and third waveguide optical delay lines comprises a single mode waveguide on a substrate.

8. The system according to claim 7, wherein each of the first, second and third waveguide optical delay lines comprises a silicon waveguide.

9. The system according to claim 8, wherein at least one of the first, second and third waveguide optical delay lines is about 75 µm long providing about 1 ps of delay.

10. The system according to claim 8, wherein at least one of the first, second and third waveguide optical delay line is about 225 µm long providing about 3 ps of delay.

11. A method of compensating skew in an optical network, comprising the steps of:
generating an input optical signal comprising first, second, third and fourth optical component signals in a transmitter;
receiving the first, second, third and fourth optical component signals from the transmitter via an optical medium in a receiver;
converting the first, second, third and fourth optical component signals into first, second, third and fourth electrical component signals, respectively, wherein the second, third and fourth electrical component signal is subject to a timing delay relative to the first electrical component signal caused by the transmitter, the optical medium and the receiver;
passing the second optical component signal through a first skew compensation element consisting of a first waveguide optical delay line, consisting of a first single fixed length of waveguide configured to apply a first single fixed predetermined compensation timing delay to the second optical component signal, to at least partially compensate for the timing delay in the second electrical component signal;
passing the third optical component signal through a second skew compensation element consisting of a second waveguide optical delay line, consisting of a second single fixed length of waveguide configured to apply a second single fixed predetermined compensation timing delay to the third optical component signal, to at least partially compensate for the timing delay in the third electrical component signal; and
passing the fourth optical component signal through a third skew compensation element consisting of a third waveguide optical delay line, consisting of a third single fixed length of waveguide configured to apply a third single fixed predetermined compensation timing delay to the fourth optical component signal, to at least partially compensate for the timing delay in the fourth electrical component signal.

12. The method according to claim 11, further comprising:
splitting the input optical signal into first and second polarized components in a polarization beam splitter;
generating first and second oscillator components in a local oscillator;
generating the first and second optical component signals, which are phase differentiated, from the first polarized component and the first oscillator component in a first hybrid mixer; and
generating the third and fourth optical component signals, which are phase differentiated, from the second polarized component and the second oscillator component in a second hybrid mixer.

13. The method according to claim 12, wherein the first, second and third waveguide optical delay lines are disposed between the polarization beam splitter and at least one of the first and second hybrid mixer, and between the local oscillator and at least one of the first and second hybrid mixer.

14. The method according to claim 12, wherein the receiver further comprises respective photodiodes and electrical amplifiers for converting each of said first, second, third and fourth optical component signals into the first, a second, a third and a fourth electrical component signals, and thereby contributing to the generation of the timing delays in the second, third and fourth electrical component signals.

15. The method according to claim 14, wherein the first, second and third waveguide optical delay lines are disposed between the first and second hybrid mixers and the respective photodiodes.

16. The method according to claim 11, wherein the first, second and third skew compensation elements are disposed in the transmitter.

17. The method according to claim 11, further comprising:
i) determining the timing delays in the first, second and third electrical component signals based on experience or measurement;
ii) manufacturing the first, second and third waveguide optical delay lines based on step i).

18. A transmitter system, comprising:
a transmitter capable of generating an input optical signal comprising first, second, third and fourth optical component signals, and transmitting the input optical signal over an optical medium to a receiver, which is capable of converting the first, second, third and fourth optical component signals into first and second electrical component signals, respectively; the second, third and fourth electrical component signals subject to timing delays relative to the first electrical component signal caused by the transmitter, the optical medium and the receiver;
a first skew compensation element consisting of a waveguide optical delay line, consisting of a single fixed length of waveguide configured to apply a single fixed predetermined compensation timing delay to the second optical component signal, to at least partially compensate for at least one of the timing delays in the second electrical component signal;
a second skew compensation element consisting of a second waveguide optical delay line, consisting of a second single fixed length of waveguide configured to apply a second single fixed predetermined compensation timing delay to the third optical component signal, to at least partially compensate for the timing delay in the third electrical component signal; and a third skew compensation element consisting of a third waveguide optical delay line, consisting of a third single fixed length of waveguide configured to apply a third single fixed predetermined compensation timing delay to the fourth optical component signal, to at least partially compensate for the timing delay in the fourth electrical component signal.

* * * * *